United States Patent [19]

Thompson

[11] 4,408,744

[45] Oct. 11, 1983

[54] COMPACT, PLANAR, MULTI-DIRECTIONAL VIBRATION ATTENUATOR SEAT SUPPORT

[75] Inventor: Raymond D. Thompson, Waterloo, Iowa

[73] Assignee: Deere & Company, Moline, Ill.

[21] Appl. No.: 219,987

[22] Filed: Dec. 24, 1980

[51] Int. Cl.³ .............................................. B60N 1/08
[52] U.S. Cl. ..................................... 248/636; 248/429
[58] Field of Search .............. 248/429, 430, 424, 636, 248/562, 565, 569, 570, 581, 583; 267/131, 136, 140.1; 188/378

[56] References Cited

U.S. PATENT DOCUMENTS

| Re. 2,693 | 7/1867 | Brett ..................................... 248/618 |
|---|---|---|
| 1,377,332 | 5/1921 | Franz ..................................... 248/230 |
| 2,394,853 | 2/1946 | Goddard .............................. 248/562 |
| 2,924,419 | 2/1960 | Wells ................................ 267/140.1 |
| 2,932,342 | 4/1960 | Simons et al. ......................... 155/14 |
| 3,061,260 | 10/1962 | Simons et al. ........................ 248/399 |
| 3,100,617 | 8/1963 | Radke et al. .......................... 248/430 |
| 3,100,618 | 8/1963 | Tengler et al. ....................... 248/430 |
| 3,190,592 | 6/1965 | Grizzle, Jr. ............................. 248/20 |
| 3,245,486 | 4/1966 | Oswald ...................................... 180/1 |
| 3,258,241 | 6/1966 | Oswald ................................. 248/430 |
| 3,335,996 | 8/1967 | Hall et al. ............................. 248/400 |
| 3,371,899 | 3/1968 | Johnson ................................ 248/569 |
| 3,917,210 | 11/1975 | Miller ................................... 248/419 |
| 3,999,800 | 12/1976 | Penzotti ............................... 297/345 |
| 4,003,534 | 1/1977 | Kenigsberg et al. ............... 248/562 |
| 4,099,777 | 7/1978 | Chekirda .............................. 297/375 |
| 4,128,217 | 12/1978 | Mazelsky ........................ 244/122 R |
| 4,195,883 | 4/1980 | Ronnhult et al. ................... 297/302 |
| 4,228,984 | 10/1980 | Thompson et al. ................. 248/636 |

FOREIGN PATENT DOCUMENTS

| 398238 | 11/1957 | Canada ................................. 248/569 |
|---|---|---|
| 782871 | 4/1968 | Canada ................................. 248/429 |
| 742189 | 3/1933 | France . |
| 1303936 | 1/1973 | United Kingdom . |

Primary Examiner—Ramon S. Britts
Assistant Examiner—Michael F. Trettel
Attorney, Agent, or Firm—Fraser and Bogucki

[57] ABSTRACT

A compact, planar, multi-directional vibration attenuator seat support permits attenuating movement of an attached seat in any direction within a horizontal plane in response to vibration and other motions. The seat support includes a thin, generally planar seat supporting frame having opposite sides which mount the opposite ends of a first plurality of rods slidably received within a first plurality of bearings coupled to the opposite ends of an intermediate frame so that the seat supporting frame is movable along a first axis relative to the intermediate frame. The intermediate frame which is substantially completely contained within the plane of the seat supporting frame has opposite sides mounting the opposite ends of a second plurality of rods slidably received within a second plurality of bearings which mount the entire seat support and which permit movement of the intermediate frame along a second axis perpendicular to the first axis. Shock absorbers damp movement of the seat supporting frame relative to the intermediate frame and movement of the intermediate frame relative to the second plurality of bearings, while opposed pairs of springs hold the seat supporting and intermediate frames in nominal center positions.

12 Claims, 8 Drawing Figures

COMPACT, PLANAR, MULTI-DIRECTIONAL VIBRATION ATTENUATOR SEAT SUPPORT

BACKGROUND OF THE INVENTION

1. Field of the Invention

The present invention relates to seats for tractors and other off-road vehicles which encounter substantial amounts of vibration and other motion, and more particularly to seats for such vehicles which are capable of undergoing attenuating movement in response to the vibration and other motion.

2. History of the Prior Art

Off-road vehicles such as agricultural tractors and similar vehicles subject the rider to a substantial amount of vibration and other motion due to the nature of the vehicle itself and particularly to the roughness and unevenness of terrain typically negotiated by such vehicles. Consequently, it is common to provide the seats in such vehicles with the ability to undergo limited attenuating movement in one or more directions to compensate for such vibrations and other motion. Many early tractor seats, for example, were constructed so as to be capable of undergoing some vertical movement. This movement was typically controlled using damping pistons and similar apparatus. Later tractor seats came to be provided with attenuating horizontal movement in addition to or in lieu of attenuating vertical movement.

An example of a seat for use with tractors and similar off-road vehicles which is capable of attenuating movement in a generally horizontal direction is provided by a co-pending application Ser. No. 960,125, filed Nov. 13, 1978 and assigned to the assignee of the present application. The seat described in that patent application is capable of attenuating fore-aft motion by an underseat arrangement which includes a plurality of bearings slidable along parallel bars. The seat is retained in a nominal position by an opposing pair of springs, and motion of the seat is damped by a piston.

Further examples of prior art seat arrangements which provide attentuating fore-aft movement are provided by U.S. Pat. No. 3,258,241 of Oswald, U.S. Pat. No. 3,100,617 of Radke et al and U.S. Pat. No. 2,932,342 of Simons et al. Shock absorption of seat movement in the fore-aft direction is described in U.S. Pat. No. 3,190,592 of Grizzle, Jr. and U.S. Pat. No. 3,100,618 of Tengler et al.

Still other examples of prior art seat arrangements permitting limited or attenuating movement are provided by U.S. Pat No. 3,245,486 of Oswald, U.S. Pat. No. 3,335,996 of Hall et al, U.S. Pat. No. 3,061,260 of Simons et al, U.S. Pat. No. 3,999,800 of Penzotti, U.S. Pat. No. 4,099,777 of Chekirda, U.S. Pat. No. 3,917,210 of Miller, U.S. Pat. No. 4,195,883 of Ronnhult et al, U.S. Pat. No. 4,128,217 of Mazelsky, French Pat. No. 742,189 of Fricard and British patent specification No. 1,303,936 of Nystrom.

The prior art seat arrangements previously described typically limit attenuating movement in a horizontal plane or direction to a single axis or direction of movement. Based on the types of motion typically encountered by the vehicle the direction may be fore-aft or lateral. As a practical matter, the vibrations and other motions encountered occur in all directions, even though they may be more severe in one direction such as fore-aft than in a lateral direction.

It would therefore be desirable to provide a seat capable of undergoing attenuating movement along more than one axis within a generally horizontal plane. Ideally, the seat should be capable of attenuating movement in any and all directions within a generally horizontal plane.

Two different arrangements which provide for attenuating movement in any direction within a generally horizontal plane are described in a co-pending application of James E. Thompson et al, Ser. No. 219,900, filed Dec. 12, 1980, and assigned to the assignee of the present application. In both arrangements an intermediate assembly is arranged so as to be capable of movement along a first axis relative to a base assembly and a seat assembly which rotatably mounts a seat is arranged so as to be capable of undergoing movement relative to the intermediate assembly along a second axis perpendicular to the first axis. Relative movements between the intermediate assembly, the base assembly and the seat assembly are damped by shock absorbers coupled therebetween and are resisted by opposing pairs of springs.

In the first arrangement described in the co-pending application of James E. Thompson et al the intermediate assembly comprises a bearing retainer plate having bearing clusters mounted therein as well as elongated slots which receive rollers rotatably mounted on an underlying base plate and an overlying plate forming part of the seat assembly. The overlying plate rotatably supports a seat mounting plate to which the seat is fastened and which is coupled through springs and shock absorbers to a central stud mounted on the base plate.

In the second arrangement described in the co-pending application of James E. Thompson et al, the intermediate assembly is made movable relative to the base and seat assemblies by different pluralities of rollers rotatably mounted within the intermediate assembly about two different pluralities of parallel axes which are perpendicular to each other. The relative movements are damped and restrained by shock absorbers and spring pairs.

The arrangements described in the co-pending application of James E. Thompson et al comprise a significant advancement over the art in their ability to provide attenuating movement in any direction within a generally horizontal plane so as to optimize operator comfort. However, there may be occasions or applications where other arrangements are necessary or desirable. In particular, it would be highly advantageous in any event, and it may become necessary in some applications, to provide a relatively thin, planar arrangement in which substantially all of the parts of the seat support are contained within a thin, compact enclosure.

BRIEF DESCRIPTION OF THE INVENTION

The above and other objects are accomplished in accordance with the invention by providing a seat support capable of undergoing attenuating movement in any direction within a generally horizontal plane and at the same time configured so as to be housed within a relatively thin, compact housing or enclosure. An outer seat mounting frame which generally defines the outer boundaries of the seat support and which is adapted to have a seat mounted thereon is of relatively thin, generally planar configuration and has an opposite pair of sides. A first plurality of rods extend between and are coupled to the opposite sides of the seat mounting frame and are slidably received within a first plurality of bearings mounted on an intermediate frame. The rods slide within the bearings to permit movement of the seat mounting frame relative to the intermediate frame along a first axis, which movement is damped by a first shock absorber coupled between the seat mounting frame and the intermediate frame and is limited or restrained by a pair of springs coupled between the intermediate frame and the opposite sides of the seat mounting frame. The intermediate frame is made movable relative to a second plurality of bearings along a second axis perpendicular to the first axis by a second plurality of rods which are slidably received within the second plurality of bearings and which extend between and are coupled to opposite portions of the intermediate frame. The second plurality of bearings are used to mount the seat support. Movement of the intermediate frame relative to the second plurality of bearings is damped by a second shock absorber coupled therebetween and is limited by a second pair of springs coupled between the opposite portions of the intermediate frame and the second plurality of bearings.

The combined action of attenuating movement of the intermediate frame relative to the second plurality of bearings along the second axis and simultaneous movement of the seat mounting frame relative to the intermediate frame along the first axis permits the seat mounting frame and consequently the seat which is mounted thereon to undergo attenuating movement in any direction within the generally horizontal plane defined by the seat support in response to vibrations and other motions. The various components including the intermediate frame, the rods, the bearings, the shock absorbers and the springs are substantially completely contained within the thin, planar configuration defined by the seat mounting frame so as to provide a compact planar structure.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
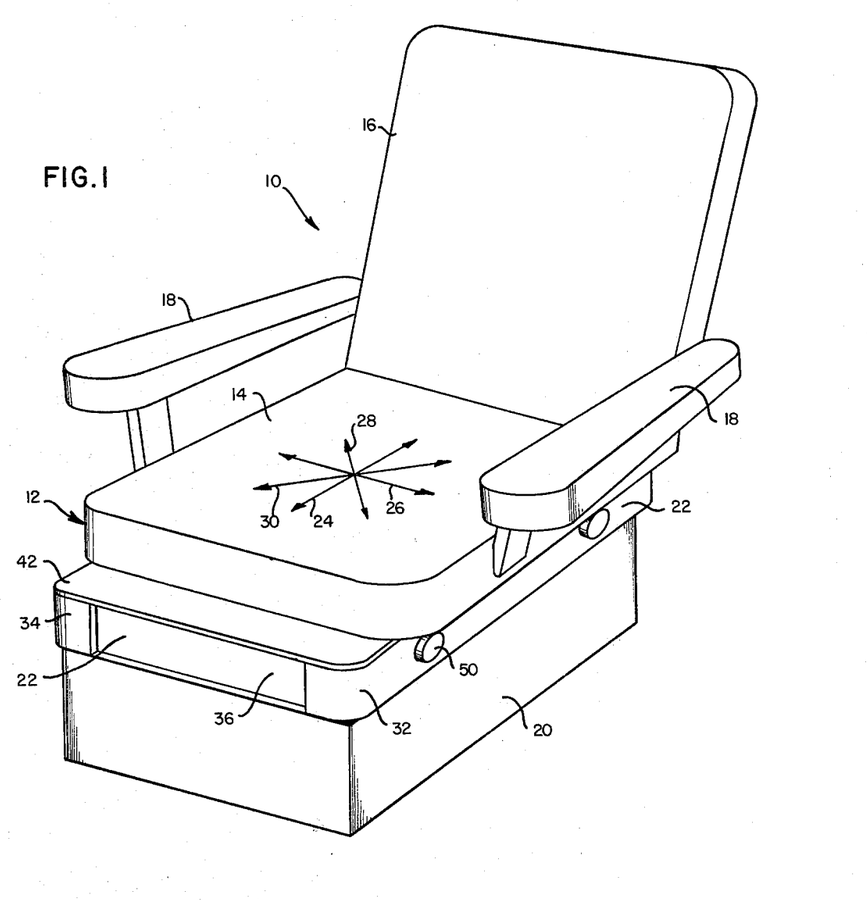
FIG. 1 is a perspective view of a seat arrangement utilizing a compact, planar, multi-directional vibration attenuator seat support in accordance with the invention.

FIG. 1 depicts a seating arrangement 10 in accordance with the invention. The seating arrangement 10 includes a seat 12 comprised of a seat cushion 14, a backrest 16 and opposite armrests 18. The seat 12 is mounted on a supporting member 20 by a compact, planar, multi-directional vibration attenuator seat support 22.

The seat support 22 which is of relatively thin, generally planar configuration provides for attenuating movement of the seat 12 in any direction within a generally horizontal plane. Thus, the seat 12 is movable relative to the supporting member 20 in the fore-aft direction as represented by a double headed arrow 24. The seat 12 is also movable laterally relative to the supporting member 20 as represented by a double headed arrow 26. The seat 12 is also movable in any direction between the arrows 24 and 26. For example, the seat 12 may move to the left-front or to the right-rear as represented by a double arrow 28. The seat 12 may also move to the right-front or left-rear as represented by a double headed arrow 30. The various arrows 24, 26, 28 and 30 merely represent examples of directions in which the seat 12 can move relative to the supporting member 20 within a generally horizontal plane. What is important is the fact that the seat 12 is not limited to one or more axes of attenuating movement but can move in any direction within the generally horizontal plane in response to vibration and other motions exerted on the seat 12 and its occupant.

Figure 2:
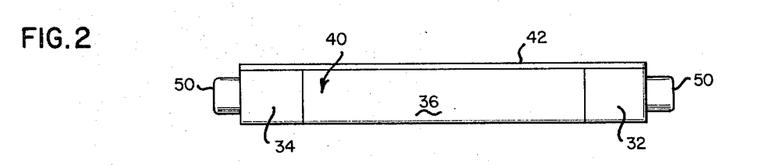
FIG. 2 is a front view of the seat support of FIG. 1.
Figure 3:
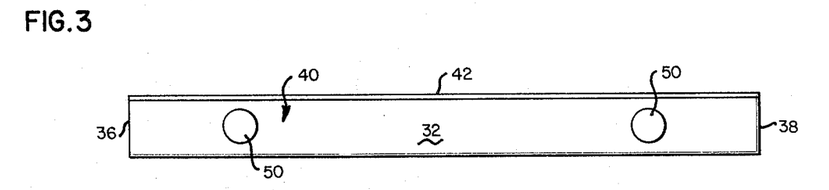
FIG. 3 is a side view of the seat support of FIG. 1.

FIGS. 2 and 3 respectively comprise front and side views of the seat support 22. The seat support 22 includes opposite, spaced-apart, generally parallel side frames 32 and 34 joined at their opposite ends to opposite end frames 36 and 38. The opposite ends of each of the side frames 32 and 34 curve through an approximately right angle so as to overlap and join with the opposite ends of the end frames 36 and 38. The side frames 32 and 34 and the end frames 36 and 38 together define a seat supporting frame 40 of thin, planar, rectangular configuration. The seat supporting frame 40 is covered by a top cover 42. Each of the side frames 32 and 34 includes a pair of end caps 50 which cover the ends of a plurality of elongated rods which are described hereafter.

Figure 4:
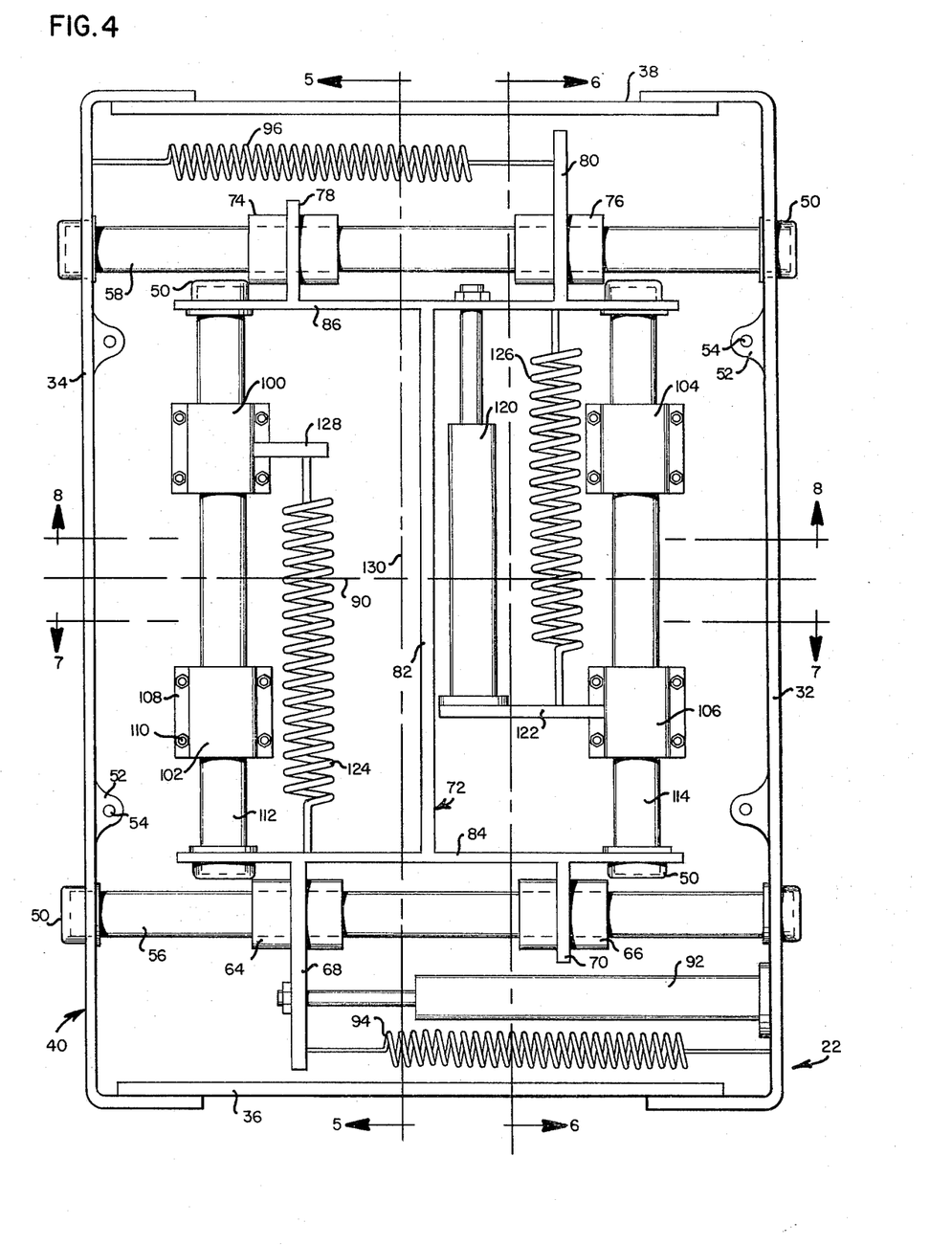
FIG. 4 is a top, plan view of the seat support of FIG. 1 with the top cover removed.
Figure 5:
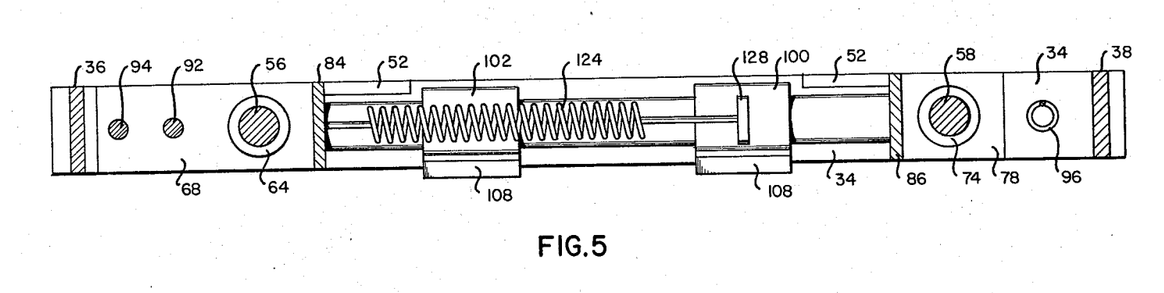
FIG. 5 is a sectional view taken along the line 5—5 of FIG. 4.
Figure 6:
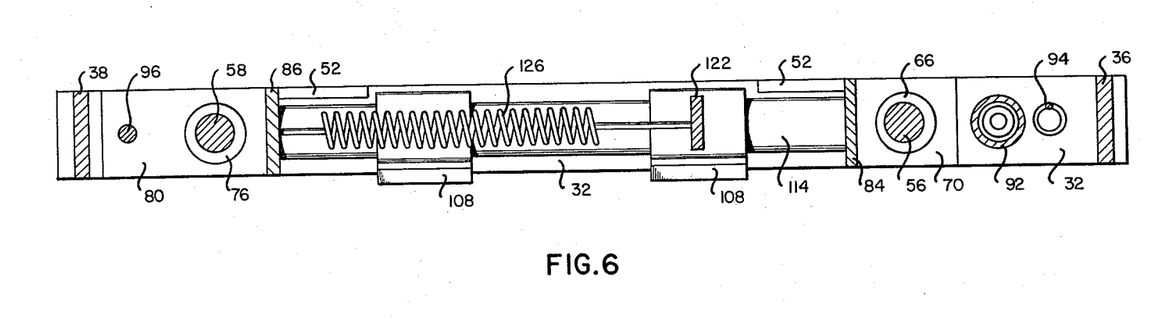
FIG. 6 is a sectional view taken along the line 6—6 of FIG. 4.
Figure 7:
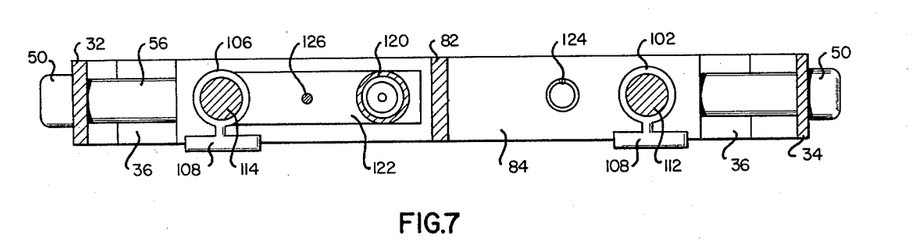
FIG. 7 is a sectional view taken along the line 7—7 of FIG. 4.
Figure 8:
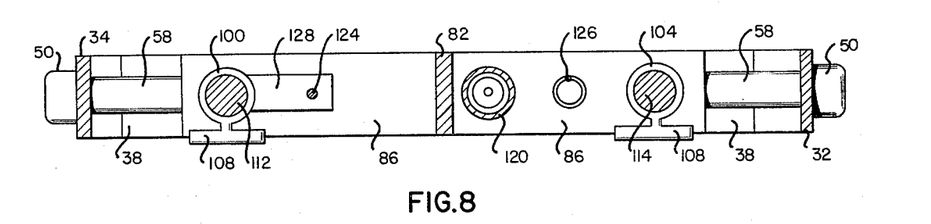
FIG. 8 is a sectional view taken along the line 8—8 of FIG. 4.

FIG. 4 depicts the seat support 22 with the top cover 42 removed to show the interior details. Each of the side frames 32 and 34 is provided with a pair of seat mounting brackets 52 mounted on the inside of the frame 40 in spaced-apart relation adjacent the upper edges of the frames 32 and 34. Each of the brackets 52 has an aperture 54 therein. The seat 12 is mounted on the supporting frame 40 by bolts or other appropriate fasteners which extend from the seat through the top cover 42 and through the apertures 54 in the mounting brackets 52.

The opposite side frames 32 and 34 of the seat supporting frame 40 receive the opposite ends of a first plurality of elongated rods comprising a rod 56 and a rod 58. The rods 56 and 58 are disposed in generally parallel, spaced-apart relation to each other. As a result the rod 56 is disposed adjacent and parallel to the end frame 36, while the rod 58 is disposed generally parallel to and adjacent the end frame 38. The opposite ends of the rods 56 and 58 are received within the end caps 50 which are mounted within the side frames 32 and 34. The rod 56 is slidably received within a spaced-apart pair of bearings 64 and 66 respectively mounted within end portions 68 and 70 of an intermediate frame 72. The rod 58 is slidably received by a second pair of bearings 74 and 76 respectively mounted within end portions 78 and 80 of the intermediate frame 72.

In addition to the end portions 68, 70, 78 and 80, the intermediate frame 72 includes a central member 82 and a pair of opposite sides 84 and 86. The central member 82 extends between and has its opposite ends coupled to intermediate portions of the opposite sides 84 and 86 so as to hold the sides 84 and 86 in spaced-apart, generally parallel relation. The end portions 68 and 70 extend outwardly from the side 84 at generally right angles to the side 84 on the opposite side of the side 84 from the central member 82. The end portions 78 and 80 extend outwardly from the side 86 at generally right angles to the side 86 on the opposite side of the side 86 from the central member 82.

Because the various bearings 64, 66, 74 and 76 are slidable along the rods 56 and 58, the seat supporting frame 40 is movable relative to the intermediate frame 72 along a first axis 90. Relative movement therebetween is damped by a lateral shock absorber 92 disposed adjacent and generally parallel to the rod 56 and extending from the side frame 32 to the end portion 68. The shock absorber 92 is preferably of the variable orifice type so that the amount of damping provided thereby can be adjusted. The seat supporting frame 40 is normally maintained in a nominal center position relative to the intermediate frame 72 by an opposing pair of springs 94 and 96 which are both held in tension. The spring 94 is disposed adjacent and generally parallel to the lateral shock absorber 92 and extends between and is coupled to the side frame 32 and the end portion 68. The spring 96 is disposed adjacent and generally parallel to rod 58 and extends between and is coupled to the side frame 34 and the end portion 80. Movement of the seat supporting frame 40 to the right as viewed in FIG. 4 results in reduction of the tension in the spring 94 and increased tension in the spring 96. Conversely, movement of the frame 40 to the left as viewed in FIG. 4 results in increased tension in the spring 94 and reduced tension in the spring 96. It will therefore be seen that the springs 94 and 96 provide a controlled amount of resistance to movement of the seat supporting frame 40 relative to the intermediate frame 72 in either direction along the first axis 90. The springs 94 and 96 tend to restore and maintain the frame 40 at the nominal center position relative to the intermediate frame 72 as shown in FIG. 4.

The seat support 22 shown in FIG. 4 is mounted on the supporting member 20 shown in FIG. 1 by four different bearings 100, 102, 104 and 106. Each of the bearings 100, 102, 104 and 106 has a relatively flat base 108 secured to the bottom thereof and provided with apertures 110 for receiving screws or other fasteners to mount the bearings on the supporting member 20. The bearings 100 and 102 slidably receive an elongated rod 112 extending between and having the opposite ends thereof coupled to the sides 84 and 86 of the intermediate frame 72. The opposite ends of the rod 112 are received by a pair of the end caps 50 which are mounted within the sides 84 and 86. The bearings 104 and 106 slidably receive an elongated rod 114 extending between and having the opposite ends thereof coupled to the sides 84 and 86 by a pair of the end caps 50. The rods 112 and 114 are disposed on opposite sides of the central member 82 of the intermediate frame 72 so as to assume a spaced-apart, generally parallel relationship with each other.

A fore-aft shock absorber 120 is disposed between and generally parallel to the central member 82 and the rod 114. The shock absorber 120 extends between and is coupled to the side 86 of the intermediate frame 72 and a bracket 122 mounted on and extending from the bearing 106. A second pair of springs comprised of springs 124 and 126 is coupled in opposing relation between the bearings 100, 102, 104 and 106 and the intermediate frame 72 with both being held in tension. The spring 124 which is disposed between and generally parallel to the central member 82 and the rod 112 extends between and is coupled to the side 84 of the intermediate frame 72 and a bracket 128 extending outwardly from and coupled to the bearing 100. The spring 126 is disposed between and generally parallel to the fore-aft shock absorber 120 and the rod 114 and extends between and is coupled to the side 86 of the intermediate frame 72 and the bracket 122.

The sliding relationship of the rods 112 and 114 relative to the bearings 100, 102, 104 and 106 permits the intermediate frame 72 to undergo sliding movement relative to the supporting member 20 on which the bearings 100, 102, 104 and 106 are mounted along a second axis 130 which is generally perpendicular to the first axis 90. Such movement is damped by the fore-aft shock absorber 120 and restrained by the opposing springs 124 and 126. Movement of the intermediate frame 72 in a downward direction as viewed in FIG. 4 reduces the tension in the spring 124 and increases the tension in the spring 126. Conversely, movement of the intermediate frame 72 in an upward direction as viewed in FIG. 4 increases the tension in the spring 124 and at the same time reduces the tension in the spring 126. It will therefore be seen that the springs 124 and 126 resist movement of the intermediate frame 72 out of a nominal center position relative to the bearings 100, 102, 104 and 106.

The first axis 90 coincides with the lateral direction of movement of the seat 12 and the second axis 130 coincides with the fore-aft direction of movement of the seat 12. The intermediate frame 72 is capable of undergoing movement in the fore-aft direction along the second axis 130 as just described. The seat supporting frame 40 moves with the intermediate frame 72 because it is coupled to the intermediate frame 72 via the rods 56 and 58 and the bearings 64, 66, 74 and 76. At the same time and independently of the fore-aft movement of the intermediate frame 72, the seat supporting frame 40 is capable of undergoing lateral motion relative to the intermediate frame 72 along the first axis 90 because of the sliding relationship of the rods 56 and 58 to the bearings 64, 66, 74 and 76. Because of this capability of simultaneous orthogonal movements, the seat supporting frame 40 is capable of undergoing attenuating movement in any direction within the generally horizontal plane thereof relative to the supporting member 20 on which the seat support 22 is mounted via the bearings 100, 102, 104 and 106. The shock absorbers 92 and 120 combine to damp such movement, and the springs 94, 96, 124 and 126 resist such movement and eventually return the seat supporting frame 40 and the seat 12 which is mounted thereon to the nominal center position.

As shown in FIGS. 5–8 substantially the entire seat support 22 is contained within the confines of the thin, planar configuration of the seat supporting frame 40. The various members of the intermediate frame 72 including the central member 82, the sides 84 and 86 and the end portions 68, 70, 78 and 80 have a height substantially equal to the height of the side frames 32 and 34 and the end frames 36 and 38 comprising the seat supporting frame 40. The rods 56 and 58 are mounted midway along the height of the side frames 32 and 34, and the rods 112 and 114 are mounted midway along the height of the sides 84 and 86 of the intermediate frame 72. In like fashion the shock absorbers 92 and 120 and the springs 94, 96, 124 and 126 are coupled to the side frames 32 and 34, the sides 84 and 86, the end portions 68 and 80 and the brackets 122 and 128 at intermediate portions of the heights thereof and have diameters substantially less than the heights of the various side frames, sides, end portions and brackets so as to remain within the thin, planar configuration defined by the seat supporting frame 40. The bases 108 of the bearings 100, 102, 104 and 106 extend to a level slightly lower than the bottom of the seat supporting frame 40 to provide adequate clearance between the seat support 22 and the supporting member 20.

While the invention has been particularly shown and described with reference to a preferred embodiment thereof, it will be understood by those skilled in the art that various changes in form and details may be made therein without departing from the spirit and scope of the invention.

What is claimed is:

1. A vibration attenuator seat support comprising:
a relatively thin, generally planar seat support assembly for supporting a seat, the seat support assembly having a central plane thereof;
an intermediate assembly substantially completely contained within the seat support assembly and including means for permitting limited movement of the seat support assembly relative to the intermediate assembly along a first axis generally parallel to the central plane of the seat support assembly; and
a base assembly substantially completely contained within the seat support assembly and including means for permitting limited movement of the intermediate assembly relative to the base assembly along a second axis generally parallel to the central plane of the seat support assembly and extending in a direction generally perpendicular to the direction of the first axis.

2. A vibration attenuator seat support comprising;
a relatively thin, generally planar seat support assembly for supporting a seat;
an intermediate assembly substantially completely contained within the seat support assembly and including means for permitting limited movement of the seat support assembly relative to the intermediate assembly along a first axis; and
a base assembly substantially completely contained within the seat support assembly and including means for permitting limited movement of the intermediate assembly relative to the base assembly along a second axis extending in a direction different from the direction of the first axis;
the means for permitting limited movement of the seat support assembly relative to the intermediate assembly along a first axis including a first plurality of rods mounted within the seat support assembly, the first plurality of rods being generally parallel to the first axis, and a first plurality of bearings mounted on the intermediate assembly and slidably receiving the first plurality of rods, and the means for permitting limited movement of the intermediate assembly relative to the base assembly along a second axis including a second plurality of rods coupled to the intermediate assembly within the seat support assembly, the second plurality of rods being generally parallel to the second axis, and a second plurality of bearings comprising the base assembly and slidably receiving the second plurality of rods.

3. The invention set forth in claim 2, wherein the means for permitting limited movement of the seat support assembly relative to the intermediate assembly along a first axis includes first resilient means for tending to retain the intermediate assembly in a nominal position relative to the seat support assembly and means for damping movement of the seat support assembly relative to the intermediate assembly, and wherein the means for permitting limited movement of the intermediate assembly relative to the base assembly includes second resilient means for tending to retain the base assembly in a nominal position relative to the intermediate assembly and means for damping movement of the intermediate assembly relative to the base assembly.

4. A vibration attenuator seat support comprising:
an outer frame having an opposite pair of sides;
a first plurality of generally parallel rods coupled to and extending between the opposite pair of sides of the outer frame;
an intermediate frame disposed between the opposite pair of sides of the outer frame;
a first plurality of bearings mounted on the intermediate frame and slidably receiving the first plurality of rods therein;
a second plurality of generally parallel rods coupled to the intermediate frame and forming other than a parallel relationship with the first plurality of rods;
a second plurality of bearings slidably receiving the second plurality of rods therein;
means for tending to maintain the outer frame in a nominal position relative to the intermediate frame; and
means for tending to maintain the intermediate frame in a nominal position relative to the second plurality of bearings.

5. The invention set forth in claim 4, wherein the intermediate frame has an opposite pair of sides, the second plurality of generally parallel rods are coupled to and extend between the opposite pair of sides of the intermediate frame and the second plurality of generally parallel rods are generally perpendicular to the first plurality of generally parallel rods.

6. The invention set forth in claim 5, wherein the means for tending to maintain the outer frame in a nominal position relative to the intermediate frame includes a first pair of springs coupled between the intermediate frame and the opposite pair of sides of the outer frame and the means for tending to maintain the intermediate frame in a nominal position relative to the second plurality of bearings includes a second pair of springs coupled between the second plurality of bearings and the opposite sides of the intermediate frame.

7. The invention set forth in claim 6, further including a first shock absorber coupled between the outer frame and the intermediate frame and a second shock absorber coupled between the intermediate frame and a second plurality of bearings.

8. A vibration attenuator seat support comprising:
a seat support frame of relatively thin, generally planar configuration having an opposite pair of sides;
a first pair of spaced-apart, generally parallel rods coupled to and extending between an opposite pair of sides of the seat support frame;
an intermediate frame of relatively thin, generally planar configuration having an opposite pair of sides, each of which is disposed adjacent and generally parallel to a different one of the first pair of rods;

a first pair of spaced-apart bearings coupled to opposite portions of a first one of the opposite sides of the intermediate frame and slidably receiving a first one of the first pair of rods therein;

a second pair of spaced-apart bearings coupled to opposite portions of a second one of the opposite sides of the intermediate frame and slidably receiving a second one of the first pair of rods therein;

a first pair of springs, each coupled between the intermediate frame and a different one of the opposite sides of the seat support frame;

a first shock absorber coupled between the seat support frame and the intermediate frame;

a second pair of spaced-apart, generally parallel rods coupled to and extending between the opposite pair of sides of the intermediate frame;

a third pair of spaced-apart bearings slidably receiving a first one of the second pair of rods therein;

a fourth pair of spaced-apart bearings slidably receiving a second one of the second pair of rods therein;

a second pair of springs, each coupled to one or the other of the third and fourth pairs of bearings and a different one of the opposite sides of the intermediate frame; and a second shock absorber coupled between the intermediate frame and one or the other of the third and fourth pairs of bearings.

9. The invention set forth in claim 8, wherein the intermediate frame has a central member disposed between the generally parallel to the second pair of rods and extending between and coupled to the opposite pair of sides, a first end portion extending outwardly from a first one of the opposite pair of sides of the intermediate frame opposite the central member and mounting one of the first pair of bearings therein, the first end portion having the first shock absorber and a first one of the first pair of springs coupled thereto and a second end portion extending outwardly from a second one of the opposite pair of sides of the intermediate frame opposite the central member and mounting one of the second pair of bearings therein, the second end portion having a second one of the first pair of springs coupled thereto.

10. The invention set forth in claim 9, wherein the seat support frame is of relatively small, generally uniform thickness so as to define the generally planar configuration, the intermediate frame is of generally uniform thickness which is no greater than the generally uniform thickness of the seat support frame and is substantially completely contained within the generally planar configuration of the seat support frame and the first and second pairs of rods, the first, second, third and fourth pairs of bearings, the first and second pairs of springs and the first and second shock absorbers are all substantially completely contained within the generally planar configuration of the seat support frame.

11. The invention set forth in claim 1, wherein the means for permitting limited movement of the seat support assembly relative to the intermediate assembly along a first axis includes at least a first resilient element and a first shock absorber, each of the at least a first resilient element and the first shock absorber being coupled between the seat support assembly and the intermediate assembly, and the means for permitting limited movement of the intermediate assembly relative to the base assembly along a second axis includes at least a second resilient element and a second shock absorber, each of the at least a second resilient element and the second shock absorber being coupled between the intermediate assembly and the base assembly.

12. The invention set forth in claim 11, wherein the at least a first resilient element of the means for permitting limited movement of the seat support assembly relative to the intermediate assembly along a first axis comprises a first pair of coil springs coupled between the intermediate assembly and opposite portions of the seat support assembly and extending along axes generally parallel to the first axis, and the at least a second resilient element of the means for permitting limited movement of the intermediate assembly relative to the base assembly along a second axis comprises a second pair of coil springs coupled between the intermediate assembly and opposite portions of the base assembly and extending along axes generally parallel to the second axis.

* * * * *

UNITED STATES PATENT AND TRADEMARK OFFICE
CERTIFICATE OF CORRECTION

PATENT NO. : 4,408,744

DATED : October 11, 1983

INVENTOR(S) : Raymond D. Thompson

It is certified that error appears in the above-identified patent and that said Letters Patent are hereby corrected as shown below:

Column 9, line 30, after "tween" and before "generally", "the" should read --and--.

Signed and Sealed this

Thirteenth Day of December 1983

[SEAL]

Attest:

GERALD J. MOSSINGHOFF

Attesting Officer

Commissioner of Patents and Trademarks